United States Patent Office 3,098,742
Patented July 23, 1963

3,098,742
URANIUM-MOLYBDENUM-ALUMINUM
TERNARY ALLOY
Gilbert S. Layne, Midland, Mich., and Robert J. Teitel, Northridge, Calif., assignors, by mesne assignments, to the United States of America as represented by the United States Atomic Energy Commission
No Drawing. Filed Aug. 9, 1962, Ser. No. 215,804
2 Claims. (Cl. 75—122.5)

This invention relates to a novel uranium containing alloy and more particularly is concerned with a new and useful ternary intermetallic compound of uranium-molybdenum-aluminum.

The alloy of the present invention is suitable for use as a nuclear reactor fuel element composition. Its high utility in this area is based on the facts that (1) the component elements have a low thermal neutron cross-section; (2) the alloy has a melting point of above 1200° C.; and, (3) the alloy is chemically less reactive than is pure aluminum. This ternary alloy therefore because of the hereinbefore listed characteristics, is particularly suitable for use in those reactor applications in which uranium-aluminum binary alloys presently are used.

The novel alloy composition of the present invention is a ternary intermetallic compound corresponding to the formula $UMo_2Al_{21}$ and comprises on a weight basis about 24 percent uranium, about 19 percent molybdenum and about 57 percent aluminum.

The compound is prepared by employing alloying, melting, casting and other foundry techniques as known to one skilled in the art. The following examples will serve to illustrate various methods which can be used to prepare the instant novel metallic composition but are not meant to be limiting.

Example 1

An alloy containing about 1 weight percent each of molybdenum and uranium in an aluminum matrix was prepared by heating the three metallic components together for about two hours at 850° C. The alloying was carried out under an inert atmosphere and in a graphite crucible. As the melt was cooled, a solid crystalline layer settled out. This was examined chemically for elemental analysis, by metallographic techniques and by X-ray diffraction. Chemical analysis indicated the solid product had a uranium concentration of about 23.6 weight percent, about 56.4 percent aluminum and about 17.5 percent molybdenum. (The theoretical analysis for $UMo_2Al_{21}$ is 23.9 percent uranium, 56.8 percent aluminum and 19.3 percent molybdenum.) The individual crystals were black, well formed bipyramids or plates. Density determinations of the crystals by displacement and flotation techniques gave values of between 4.00 and 4.37 grams per cubic centimeter. Single crystal X-ray diffraction data obtained with a Weissenburg camera and Cu radiation ($\lambda=1.5418$ A.) showed the crystals to be tetragonal, space group I4/amd with:

$a=b=10.266$ A.
$c=14.543$ A.
Cell volume—1532.6
Calculated density—4.317 gms. per cc.
Molecules per unit cell—4

Example 2

An alloy of 2.5 grams of Mo in 247.5 g. of Al was filtered at 800° C. through a graphite frit into an alloy containing about 50.0 grams of aluminum and about 5.0 g. of uranium. The resulting alloy was held at 800° C. for 16 additional hours to encourage growth of $UMo_2Al_{21}$ crystals. The melt was cooled, and the settled layer of compound removed. This settled layer was treated with 50 percent HCl to dissolve away entrained aluminum. Approximately 2 grams of $UMo_2Al_{21}$ crystals were recovered and identified. This material was pressed into a pellet, placed in a graphite crucible and heated under vacuum. The pellet was observed through a quartz window during the heating. At about 1225° C. the pellet began to soften. At about 1345° C. the pellet began to sag. At about 1560° C. it began to spread slightly, but never completely melted. X-ray examination of this material revealed $UMo_2Al_{21}$ remaining as the primary constituent. Approximately 5–10 percent $MoAl_5$ was also detected.

Example 3

$UMo_2Al_{21}$ was prepared by heating stoichiometric quantities of uranium, molybdenum and aluminum in an $Al_2O_3$ crucible under an argon atmosphere to a temperature of about 1600° C. for about 20 minutes. A crystalline alloy was formed which X-ray diffraction analysis showed to contain more than 90 percent $UMo_2Al_{21}$, less than 5 percent $UAl_4$, and less than 5 percent $MoAl_5$. Approximately 200 grams of alloy were prepared in this manner.

Various modifications may be made in the present invention without departing from the spirit or scope thereof, for it is understood that we limit ourselves only as defined in the appended claims.

We claim:
1. A ternary metal alloy comprising on a weight basis about 24 weight percent uranium, about 19 weight percent molybdenum and about 57 weight percent aluminum.
2. A ternary intermetallic compound corresponding to the formula $UMo_2Al_{21}$.

References Cited in the file of this patent
UNITED STATES PATENTS

| | | |
|---|---|---|
| 1,304,224 | Vogt | May 20, 1919 |
| 1,845,781 | Bossert | Feb. 16, 1932 |
| 2,043,855 | Keller | June 9, 1936 |
| 2,185,348 | Mansfield | Jan. 2, 1940 |
| 2,188,203 | Mansfield | Jan. 23, 1940 |